(12) United States Patent
Itakura et al.

(10) Patent No.: US 8,909,275 B2
(45) Date of Patent: Dec. 9, 2014

(54) WIRELESS COMMUNICATION SYSTEM

(75) Inventors: Katsuyuki Itakura, Hamura (JP);
Kazuhiro Oishi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 333 days.

(21) Appl. No.: 13/431,070

(22) Filed: Mar. 27, 2012

(65) Prior Publication Data

US 2012/0252514 A1    Oct. 4, 2012

(30) Foreign Application Priority Data

Mar. 28, 2011    (JP) ................. 2011-069437

(51) Int. Cl.
*H04B 7/00*    (2006.01)
*H04W 74/08*    (2009.01)
*H04W 74/04*    (2009.01)

(52) U.S. Cl.
CPC .......... *H04W 74/0833* (2013.01); *H04W 74/04* (2013.01)
USPC .......................................... 455/512; 370/229

(58) Field of Classification Search
USPC .................................. 455/464, 512
See application file for complete search history.

(56) References Cited

U.S. PATENT DOCUMENTS

| 7,403,504 | B2 | 7/2008 | Sawabe et al. | |
| 2011/0158206 | A1* | 6/2011 | Shrestha et al. | 370/336 |

FOREIGN PATENT DOCUMENTS

| JP | 3970563 B2 | 3/2003 |
| JP | 2003-110574 A | 4/2003 |
| JP | 3762422 B2 | 1/2006 |
| JP | 2007-053524 A | 3/2007 |

OTHER PUBLICATIONS

Japanese Office Action dated Jan. 29, 2013 (and English translation thereof) in counterpart Japanese Application No. 2011-069437.

\* cited by examiner

*Primary Examiner* — Tu X Nguyen
(74) *Attorney, Agent, or Firm* — Holtz, Holtz, Goodman & Chick PC

(57) ABSTRACT

Disclosed is a wireless communication system including: a controller and a plurality of communication terminals connected to each other for communication, and the controller includes: a first wireless communication section; a communication number control section which counts a communication number of each of the communication terminal communicated and stores the number in the storage section; and a first communication control section which sets back off information indicating priority of communication of the communication terminal according to the communication number stored in the storage section and transmits the back off information through the first wireless communication section to the communication terminal, and the communication terminal includes: a second wireless communication section; and a second communication control section which sets the back off time of communication with the controller shorter as the priority becomes higher based on the back off information received from the controller.

3 Claims, 11 Drawing Sheets

| TERMINAL IDENTIFICATION NUMBER | MINUTE PART PACKET NUMBER | | | | | | TOTAL |
|---|---|---|---|---|---|---|---|
| | 0 TO 9 | 10 TO 19 | 20 TO 29 | 30 TO 39 | 40 TO 49 | 50 TO 59 | |
| A | 10 | 12 | 0 | 22 | 30 | 5 | 79 |
| B | 23 | 33 | 0 | 18 | 25 | 23 | 122 |
| C | 16 | 5 | 0 | 22 | 6 | 18 | 67 |
| D | 0 | 0 | 0 | 0 | 0 | 0 | 0 |
| E | 0 | 4 | 0 | 0 | 0 | 0 | 4 |
| F | 0 | 0 | 0 | 0 | 0 | 0 | 0 |
| G | 0 | 0 | 0 | 0 | 0 | 0 | 0 |
| H | 0 | 0 | 0 | 0 | 0 | 0 | 0 |
| I | 0 | 0 | 0 | 0 | 0 | 0 | 0 |
| J | 0 | 0 | 0 | 0 | 0 | 0 | 0 |

| TERMINAL NUMBER (91) | BACK OFF INFORMATION (92) |
|---|---|
| 3 | BCA |

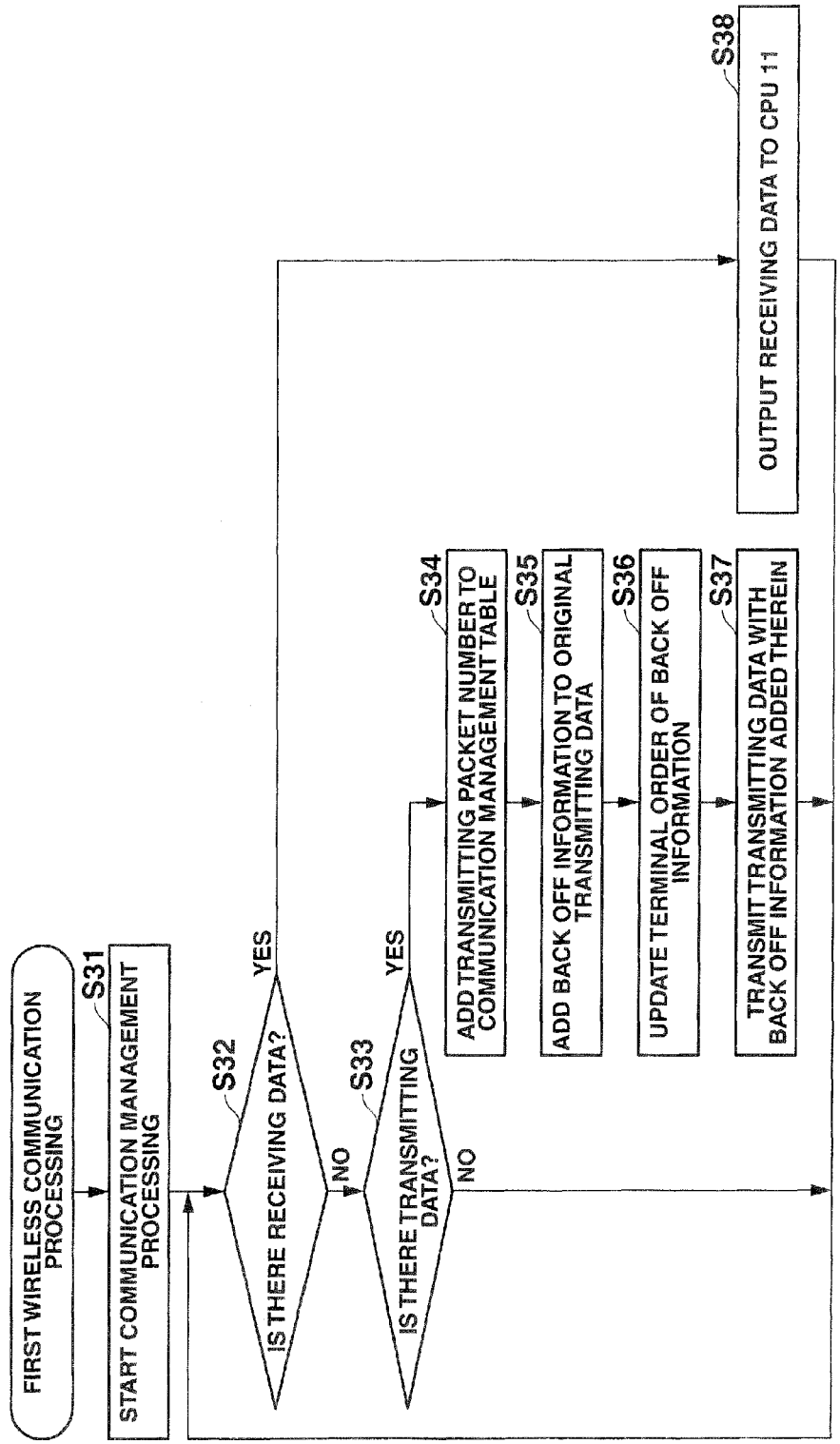

FIG.10A

| 111 | 112 | 113 | 114 | 115 | 116 |
|---|---|---|---|---|---|
| TRANSMITTING DESTINATION | TRANSMITTING SOURCE | ACK | PACKET TYPE | DATA LENGTH | DATA |
| 1 | 2 | | DATA | 64 | 1234567890... |

| 111 | 112 | 113 | 114 | 115 | 116 | 117 | 118 |
|---|---|---|---|---|---|---|---|
| TRANSMITTING DESTINATION | TRANSMITTING SOURCE | ACK | PACKET TYPE | DATA LENGTH | DATA | BACK OFF INFORMATION LENGTH | BACK OFF INFORMATION |
| 1 | 2 | | DATA | 64 | 1234567890... | 5 | 4BACE |

110a

WIRELESS COMMUNICATION SYSTEM

BACKGROUND OF THE INVENTION

1. Field of the Invention

The present invention relates to a wireless communication system.

2. Background Art

Conventionally, there is known an order entry system where in an eating establishment such as a restaurant, serving staff holds a handy terminal to input order information and dishes ready to be served is notified to the serving staff through the handy terminal.

An order entry system includes at least one handy terminal, a controller and a printer. Each of the serving staff holds one handy terminal, and order information regarding an order from a customer is input in the handy terminal. The input order information is transmitted from the handy terminal to the controller by wireless communication and is printed by the printer. The cooking staff confirms the printed order information by sight and performs the cooking.

There are some order entry systems which use specified low power radio (430 [MHz]) as wireless communication between a plurality of handy terminals and the controller. With such order entry system, stable communication can be obtained. However, since the baud rate is low and the carrier occupying time is long, when a plurality of handy terminals is used simultaneously, the radio collision rate rises and congestion occurs.

As a wireless communication method of an order entry system to avoid congestion, there is known CSMA/CA (Carrier Sense Multiple Access with Collision Avoidance). In the CSMA/CA method, when a handy terminal transmits data to a controller, carrier sense is performed and when the wireless channel is in an idle state, frame transmission is performed. Then, after back off time passes, the handy terminal performs carrier sense for the next frame transmission and after transmission deferring time passes, the handy terminal transmits the next frame to the controller.

In an order entry system which performs wireless communication in the CSMA/CA method, there is known a configuration which sets the back off time increased according to the number of handy terminals (for example, see Japanese Patent No. 3970563). Moreover, in an order entry system which performs wireless communication in the CSMA/CA method, there is known a configuration which sets the back off time, in which a condition window CW and a random number are multiplied, increased according to the number of terminals (for example, see Japanese Patent No. 3762422).

In an order entry system including a plurality of handy terminals, the number of packets of communication by each handy terminal may be unbalanced. For example, when there is an unbalance in the number of orders in each area of the establishment handled by each serving staff, the number of packets of order information is also unbalanced. However, in a conventional order area system which performs wireless communication in the CSMA/CA method, the number of packets of each handy terminal is not considered. Therefore, the handy terminal with a large number of packets is provided with the same opportunity of communication as the handy terminal with a small number of packets, and communication efficiency may become bad.

SUMMARY OF THE INVENTION

The present invention has been made in consideration of the above situation, and one of the main objects is to reduce congestion of wireless communication of each handy terminal and to enhance communication efficiency.

In order to achieve any one of the above advantages, according to an aspect of the present invention, there is provided a wireless communication system including:
a controller; and
a plurality of communication terminals, wherein
the controller and the plurality of communication terminals are connected to each other for communication,
the controller includes:
a first wireless communication section which communicates by wireless communication with the communication terminal;
a communication number control section which counts a communication number of each of the communication terminal communicated through the first wireless communication section and stores the number in the storage section; and
a first communication control section which sets back off information indicating priority of communication of the communication terminal according to the communication number stored in the storage section and transmits the back off information through the first wireless communication section to the communication terminal, and
the communication terminal includes:
a second wireless communication section which communicates by wireless communication with the controller; and
a second communication control section which sets the back off time of communication with the controller shorter as the priority becomes higher based on the back off information received from the controller through the second wireless communication section.

Consequently, according to the present invention, it is possible to reduce congestion of wireless communication of each handy terminal and to enhance communication efficiency.

BRIEF DESCRIPTION OF THE DRAWINGS

The present invention and the above-described objects, features and advantages thereof will become more fully understood from the following detailed description with the accompanying drawings and wherein;

FIG. 4 is a diagram showing a configuration of a communication management table;

FIG. 5 is a diagram showing a configuration of a back off information table;

FIG. 9 is a flowchart showing first wireless communication processing performed by the controller;

FIG. 10A is a diagram showing a configuration of original transmitting data;

FIG. 10B is a diagram showing a configuration of actual transmitting data;

DETAILED DESCRIPTION OF THE PREFERRED EMBODIMENTS

First and second embodiments of the present invention are described in detail in order with reference to the attached drawings. However, the present invention is not limited to the illustrated examples.

(First Embodiment)

The first embodiment of the present invention is described with reference to FIG. 1 to FIG. 11.

First, the apparatus configuration of the present embodiment is described with reference to FIG. 1 to FIG. 3.

Figure 1:
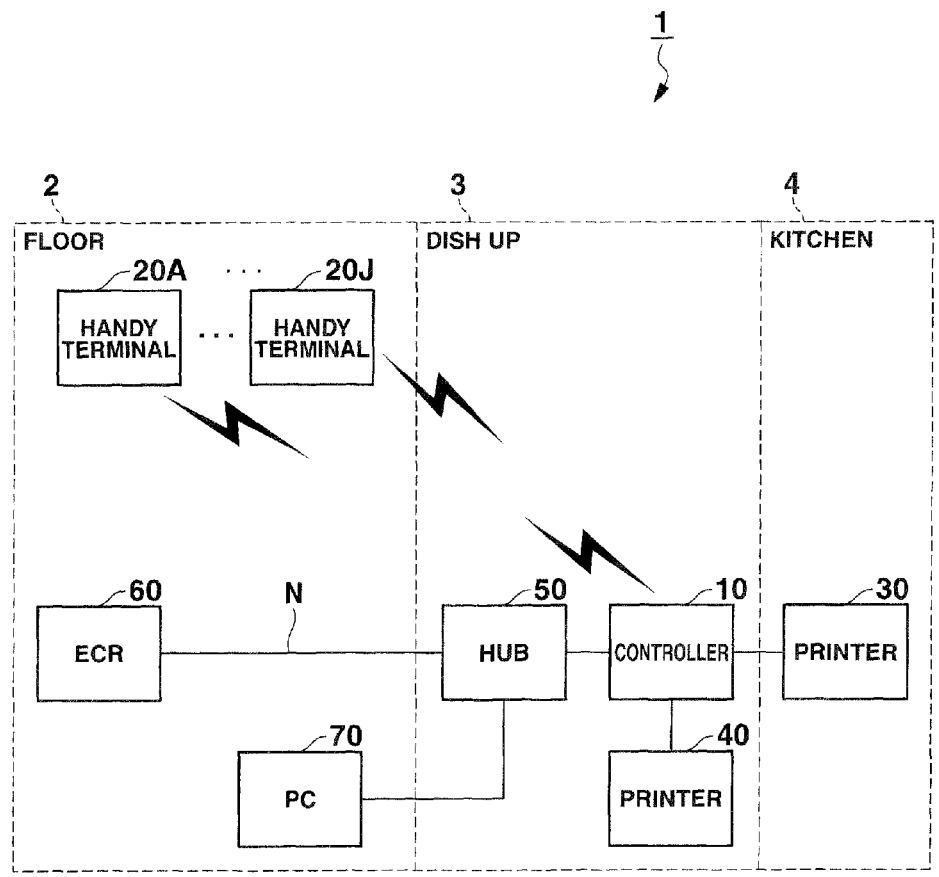
FIG. 1 is a block diagram showing a configuration of an order entry system of an embodiment of the present invention.

FIG. 1 is a block diagram showing a configuration of an order entry system 1 of the present embodiment.

Figure 2:
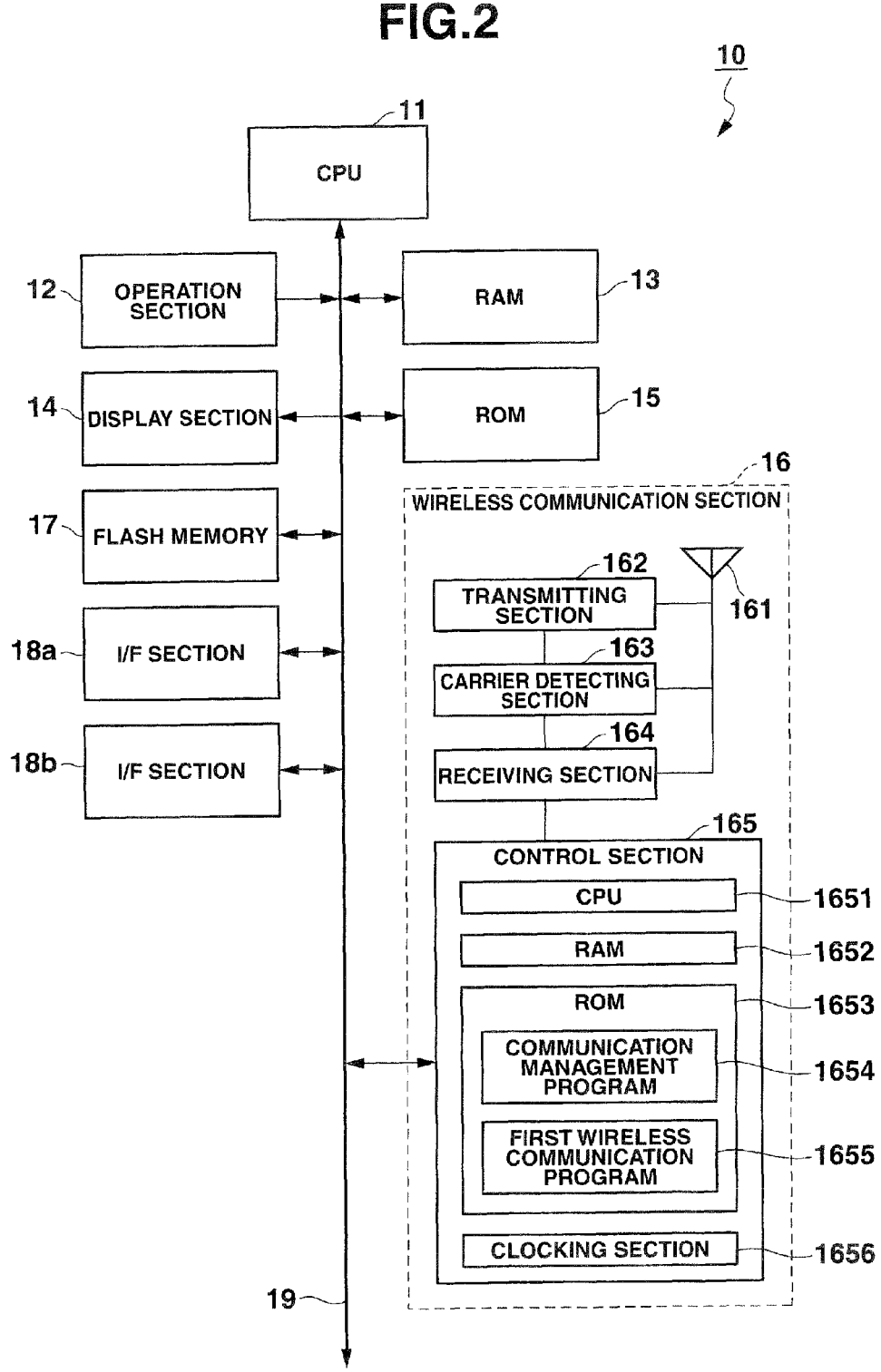
FIG. 2 is a block diagram showing a configuration of a controller.

FIG. 2 is a block diagram showing a configuration of a controller 10.

Figure 3:
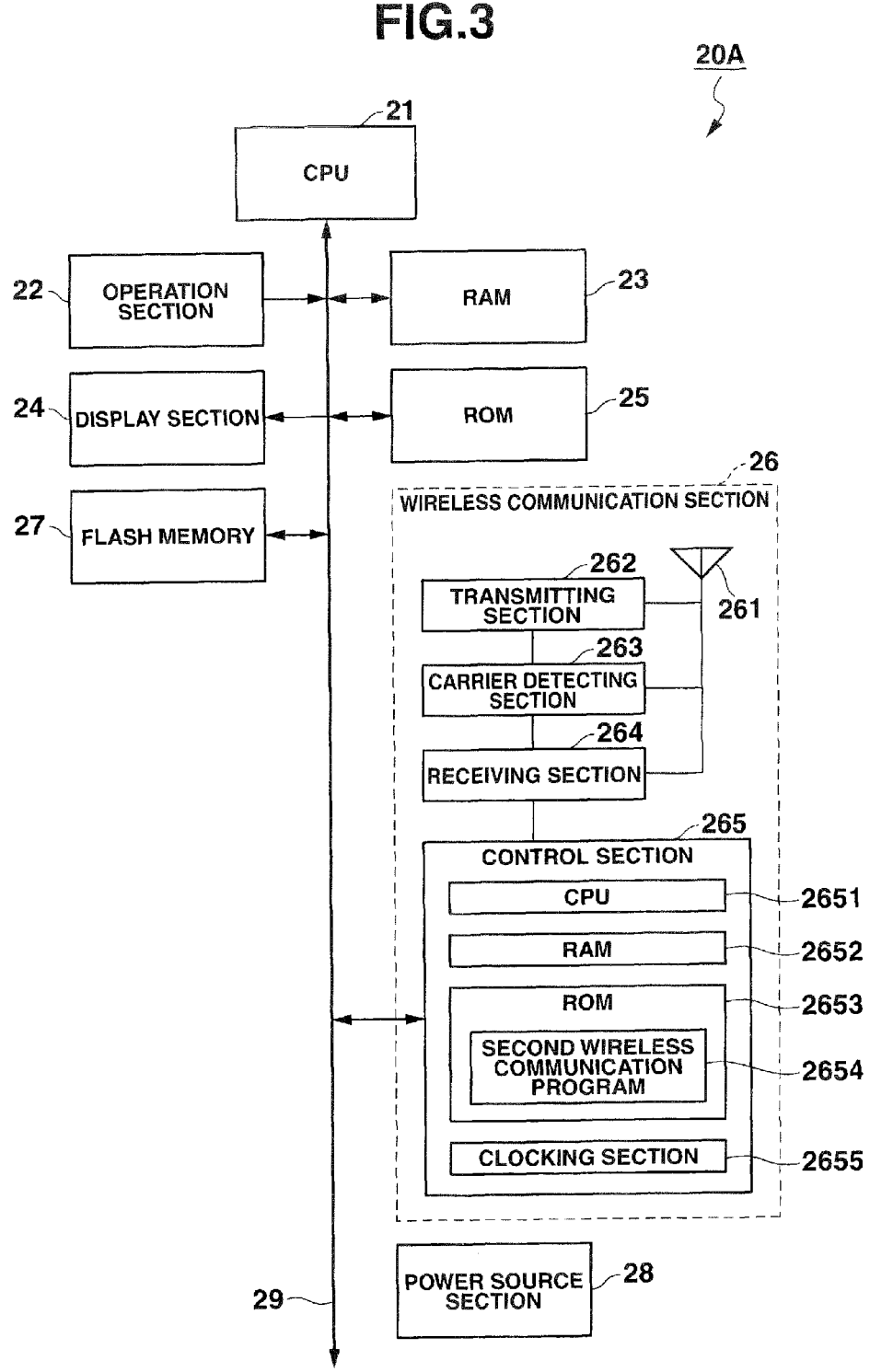
FIG. 3 is a block diagram showing a configuration of a handy terminal.

FIG. 3 is a block diagram showing a configuration of a handy terminal 20A.

The order entry system 1 as the wireless communication system is a system provided in an eating establishment such as a restaurant. With the order entry system 1, serving staff such as a waiter inputs in the handy terminal order information of an item name and amount of an item (dishes, drinks, etc.) ordered by a customer, the order information is notified to cooking staff in a kitchen, and after the item is cooked, it is notified to the serving staff that the item is ready to be served.

As shown in FIG. 1, the order entry system 1 is provided in an establishment 2 of an eating establishment. The establishment 2 includes a kitchen, a floor and a dish up. The kitchen is an area where the cooking staff cooks. The floor is where the customer eats and the serving staff is distributed. The dish up is positioned between the kitchen and the floor where the serving staff can enter, and is where delivery, etc. of a cooked item from the cooking staff to the serving staff is performed.

The order entry system 1 includes a controller 10, handy terminals 20A to 20J as communication terminals, printers 30 and 40, a hub (HUB) 50, an ECR (Electronic Cash Register) 60, and a PC (Personal Computer) 70.

The controller 10 and printers 30 and 40 are directly connected for communication. The handy terminals 20A to 20J and the controller 10 are connected by wireless LAN (Local Area Network) communication. The controller 10, the ECR 60 and the PC 70 are connected through the hub 50 by a communication network N. The communication network N is a wired LAN, etc.

The printer 30 is provided in the kitchen of the establishment 2. The controller 10, the printer 40 and the hub 50 are provided in the dish up of the establishment 2. The ECR 60 and the PC 70 are provided in the floor of the establishment 2. The handy terminals 20A to 20J are held by the ten serving staff distributed in the floor of the establishment 2.

The controller 10 is a management device of information of the order entry system 1. The controller 10 includes a communication management function such as relay of communication, etc. of each device of the order entry system 1 and a control function, etc. of printing, etc. of the printers 30 and 40.

The handy terminals 20A to 20J are each OES (Order Entry System) terminals used by the serving staff to input order information. Each one of the serving staff holds one of the handy terminals 20A to 20J.

The printer 30 is a printer which prints information of the ordered item corresponding to the order information input on the handy terminals 20A to 20J on a sheet according to control by the controller 10. The cooking staff confirms by sight the type of ordered item and the number of items described on the sheet printed by the printer 30 and cooks the ordered item.

The printer 40 is a printer which prints information of the ordered item corresponding to the order information input on the handy terminals 20A to 20J on a sheet according to control by the controller 10. The serving staff receives the cooked item from the cooking staff and also confirms by sight the type of ordered items and the number of items described on the sheet printed by the printer 40 to serve the ordered items to the customer of the floor.

The hub 50 is a line concentrator of the communication network N. The ECR 60 is a device which performs payment processing for the meal of the customer. The ECR 60 includes a function which receives information for payment from the controller 10, a function which stores money for change or money paid by the customer, a function which prints and issues a receipt, a function which registers sales data and the like.

The PC 70 is a PC which includes a function as an operation terminal for performing various setting of the controller 10, information tabulation function of order information, sales data, etc., from the ECR 60, and the like.

The number of handy terminals of the order entry system 1 is not limited to ten, and can be other plurality of numbers. The number of ECR 60 of the order entry system 1 can be two or more. The number of printers of the order entry system 1 can be one, or the number of printers can be three or more. For example, a printer for drinks, backup, items using a stove, and cold items can be provided. The number of controllers of the order entry system 1 can be two such as one as master and another as the backup master.

Next, the inner configuration of the controller 10 is described with reference to FIG. 2.

FIG. 2 is a block diagram showing a configuration of the controller 10.

As shown in FIG. 2, the controller 10 includes a CPU (Central Processing Unit) 11, an operation section 12, a RAM (Random Access Memory) 13, a display section 14, a ROM (Read Only Memory) 15, a wireless communication section 16, a flash memory 17 and I/F (Interface) sections 18a and 18b. Each section of the controller 10 is connected to each other through a bus 19.

The CPU 11 controls each section of the controller 10. The CPU 11 reads out a program specified from among various programs from the ROM 15 and expands the program to the RAM 13. The CPU 11 performs various processing in coordination with the expanded program.

The operation section 12 receives operation input of various pieces of information from the user and outputs the operation information to the CPU 11. The RAM 13 is a volatile semiconductor memory and includes a work area which stores various pieces of data and various programs.

The display section 14 is configured with an LCD (Liquid Crystal Display), etc. and performs various displays according to display information input from the CPU 11. The ROM 15 is a read only memory which stores various pieces of data and various programs.

The wireless communication section 16 performs wireless communication with the handy terminals 20A to 20J. The wireless communication section 16 includes an antenna 161, a transmitting section 162, a carrier detecting section 163, a receiving section 164 and a control section 165. The control section 165 includes a communication number control section, a CPU 1651 as a first communication control section, a RAM 1652 as a storage section, a ROM 1653 and a clocking section 1656.

The transmitting section 162 includes a signal processing section, a modulating section, etc. The transmitting section 162 performs signal processing on a signal of transmitting data input from the control section 165 with the signal processing section, modulates the signal with the modulating section, and outputs the signal as wireless radio waves from the antenna 161.

The carrier detecting section 163 detects a carrier of a channel of wireless communication and outputs the carrier detection information to the control section 165 (CPU 1651). The CPU 1651 judges whether or not the channel is open based on the carrier detection information input from the carrier detecting section 163.

The receiving section 164 includes a demodulating section, a signal processing section, etc. The receiving section 164 demodulates an electric signal of the wireless radio wave received by the antenna 161 with the demodulating section, performs signal processing with the signal processing section and outputs the signal as a signal of receiving data to the control section 165 (CPU 1651).

The CPU 1651 controls each section of the wireless communication section 16. The CPU 1651 reads out the program specified among the various programs from the ROM 1653 and expands the program to the RAM 1652. The CPU 1651 performs various processing in coordination with the expanded program.

The RAM 1652 is a volatile semiconductor memory and includes a work area which stores various pieces of data and various programs. The ROM 1653 is a read only memory which stores various pieces of data and various programs. The ROM 1653 stores a communication management program 1654 and a first wireless communication program 1655.

The clocking section 1656 is a clocking circuit which clocks the present time to be output to the CPU 1651.

Next, the inner configuration of the handy terminal 20A is described with reference to FIG. 3.

FIG. 3 is a block diagram showing a configuration of the handy terminal 20A. The configuration of the handy terminals 20B to 20J is similar to that of the handy terminal 20A, therefore the description is omitted.

As shown in FIG. 3, the handy terminal 20A includes a CPU 21, an operation section 22, a RAM 23, a display section 24, a ROM 25, a wireless communication section 26, a flash memory 27 and a power source section 28. Each section of the handy terminal 20A except for the power source section 28 is connected to each other through the bus 29.

The CPU 21 controls each section of the handy terminal 20A. The CPU 21 reads out the program specified from among the various programs from the ROM 25 and expands the program to the RAM 23. The CPU 21 performs various processing in coordination with the expanded program.

The operation section 22 receives operation input of various pieces of information from the user (serving staff) and outputs the operation information to the CPU 21. The RAM 23 is a volatile semiconductor memory and includes a work area which stores various pieces of data and various programs.

The display section 24 includes an LCD, etc. and performs various displays according to the display information input from the CPU 21. The ROM 25 is a read only memory which stores various pieces of data and various programs.

The wireless communication section 26 performs wireless communication with the controller 10. The wireless communication section 26 includes an antenna 261, a transmitting section 262, a carrier detecting section 263, a receiving section 264 and a control section 265. The control section 265 includes a CPU 2651 as a second communication control section, a RAM 2652, a ROM 2653 and a clocking section 2655.

The transmitting section 262 includes a signal processing section, a modulating section, etc. The transmitting section 262 performs signal processing on a signal of transmitting data input from the control section 265 with the signal processing section, modulates the signal with the modulating section, and outputs the signal as wireless radio waves from the antenna 261.

The carrier detecting section 263 detects a carrier of a channel of wireless communication and outputs the carrier detection information to the control section 265 (CPU 2651). The CPU 2651 judges whether or not the channel is open based on the carrier detection information input from the carrier detecting section 263.

The receiving section 264 includes a demodulating section, a signal processing section, etc. The receiving section 264 demodulates an electric signal of the wireless radio wave received by the antenna 261 with the demodulating section, performs signal processing with the signal processing section and outputs the signal as a signal of receiving data to the control section 265 (CPU 2651).

The CPU 2651 controls each section of the wireless communication section 26. The CPU 2651 reads out the program specified among the various programs from the ROM 2653 and expands the program to the RAM 2652. The CPU 2651 performs various processing in coordination with the expanded program.

The RAM 2652 is a volatile semiconductor memory and includes a work area which stores various pieces of data and various programs. The ROM 2653 is a read only memory which stores various pieces of data and various programs. The ROM 2653 stores a second wireless communication program 2654.

The clocking section 2655 is a clocking circuit which clocks the present time to be output to the CPU 2651. The power source section 28 is a secondary battery such as a lithium battery, etc. and supplies power to each section of the handy terminal 20A. The power source section 28 may be a primary battery such as an alkaline battery, etc.

Next, the information stored in the controller 10 is described with reference to FIG. 4 and FIG. 5.

FIG. 4 is a diagram showing a configuration of a communication management table 80.

FIG. 5 is a diagram showing a configuration of a back off information table 90.

As shown in FIG. 4, the communication management table 80 stored in the RAM 1652 of the controller 10 includes items of terminal identification number 81 and minute part packet number 82. The terminal identification number 81 is identification information which identifies the handy terminal which communicates with the controller 10.

The minute part packet number 82 is the number of packets for each ten minutes of packet generated time in wireless communication between the controller 10 and the handy terminal corresponding to the terminal identification number 81 and the total value (total packet number). The minute part packet number 82 counts and stores the number of packets for when the minute of the packet generated time is 0 to 9, 10 to 19, 20 to 29, 30 to 39, 40 to 49 and 50 to 59. The handy terminal with a large minute part packet number 82 is considered to have heavy communication traffic (communication frequency).

The RAM 1652 of the controller 10 stores the information of active state terminal number. The active state terminal number is the number of handy terminals in which the total packet number of the minute part packet number 82 is not 0.

As shown in FIG. 5, the back off information table 90 stored in the RAM 1652 of the controller 10 includes the items of terminal number 91 and back off information 92. The terminal number 91 is the number of handy terminals in which the total packet number is not 0.

The back off information 92 is information aligning the handy terminal corresponding to the terminal number 91 in an order of priority of wireless communication. In the back off information 92, the handy terminals 20A, 20B, 20C, 20D, 20E, 20F, 20G, 20H, 20I and 20J are represented by one letter of the alphabet A, B, C, D, E, F, G, H, I and J, respectively. Therefore, the terminal number 91 is the number of letters of the back off information 92. In the example of FIG. 5, the priority of communication of B is highest and the priority becomes lower in the order of C, A.

Next, the operation of the order entry system 1 is described with reference to FIG. 6 to FIG. 11.

Figure 6:
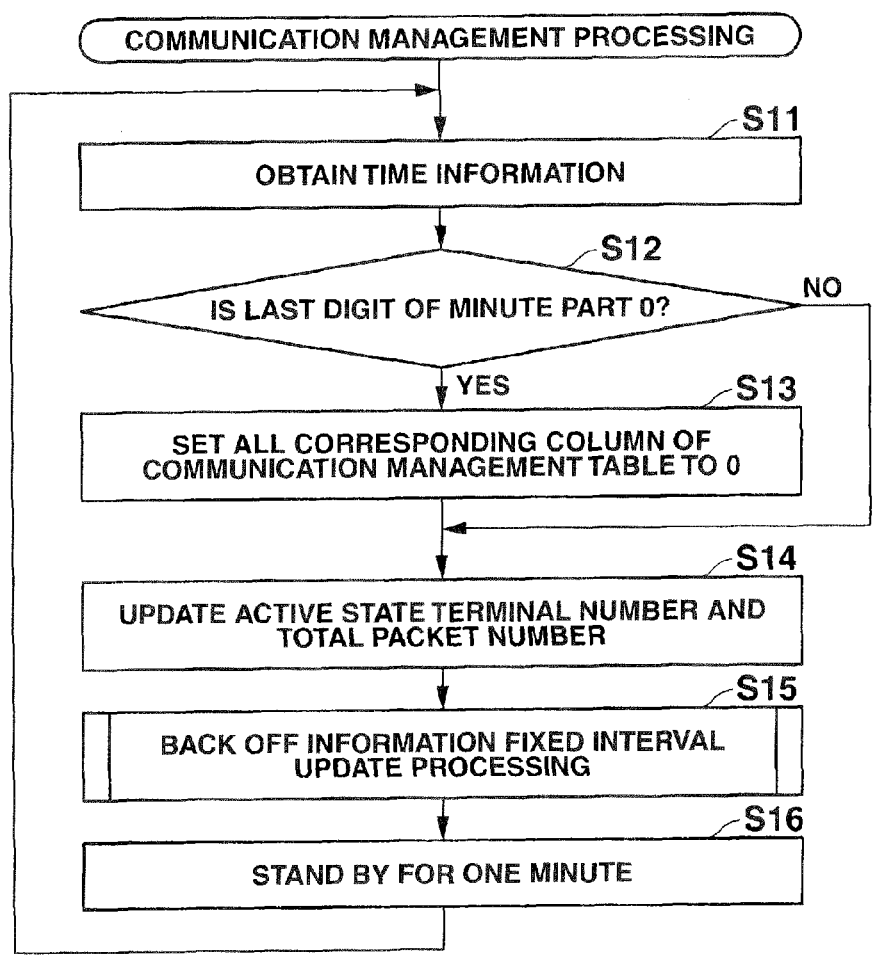
FIG. 6 is a flowchart showing communication management processing performed by the controller.

FIG. 6 is a flowchart showing a communication management processing performed by the controller 10.

Figure 7:
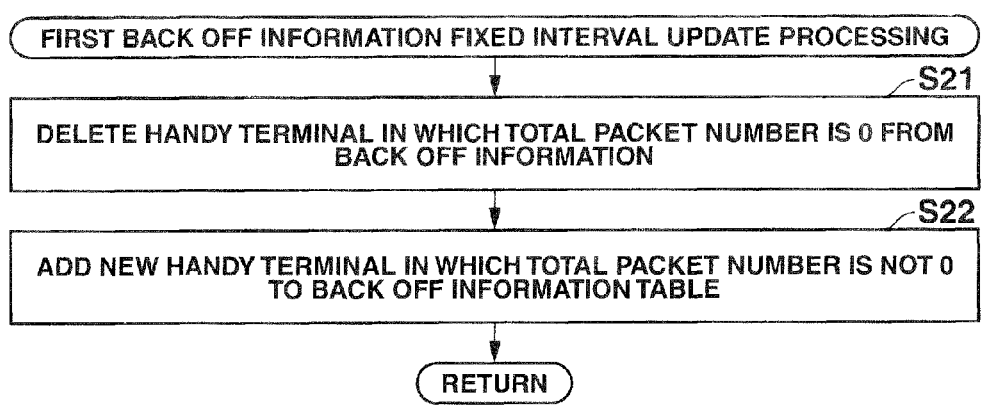
FIG. 7 is a flowchart showing first back off information fixed interval update processing of communication management processing.

FIG. 7 is a flowchart showing first back off information fixed interval update processing of communication management processing.

Figure 8:
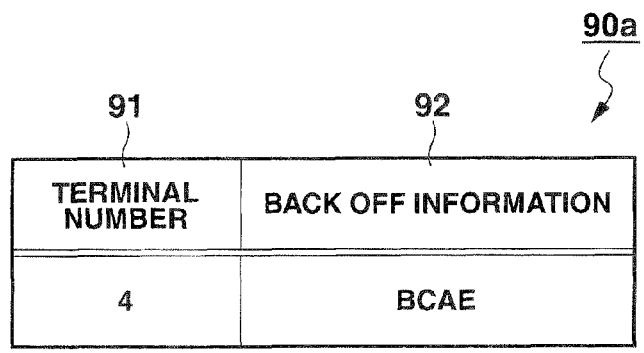
FIG. 8 is a diagram showing a configuration of a back off table after change.

FIG. 8 is a diagram showing a configuration of a back off information table 90a after change.

FIG. 9 is a flowchart showing a first wireless communication processing performed by the controller 10.

FIG. 10A is a diagram showing a configuration of original transmitting data 110.

FIG. 10B is a diagram showing a configuration of actual transmitting data 110a.

Figure 11:
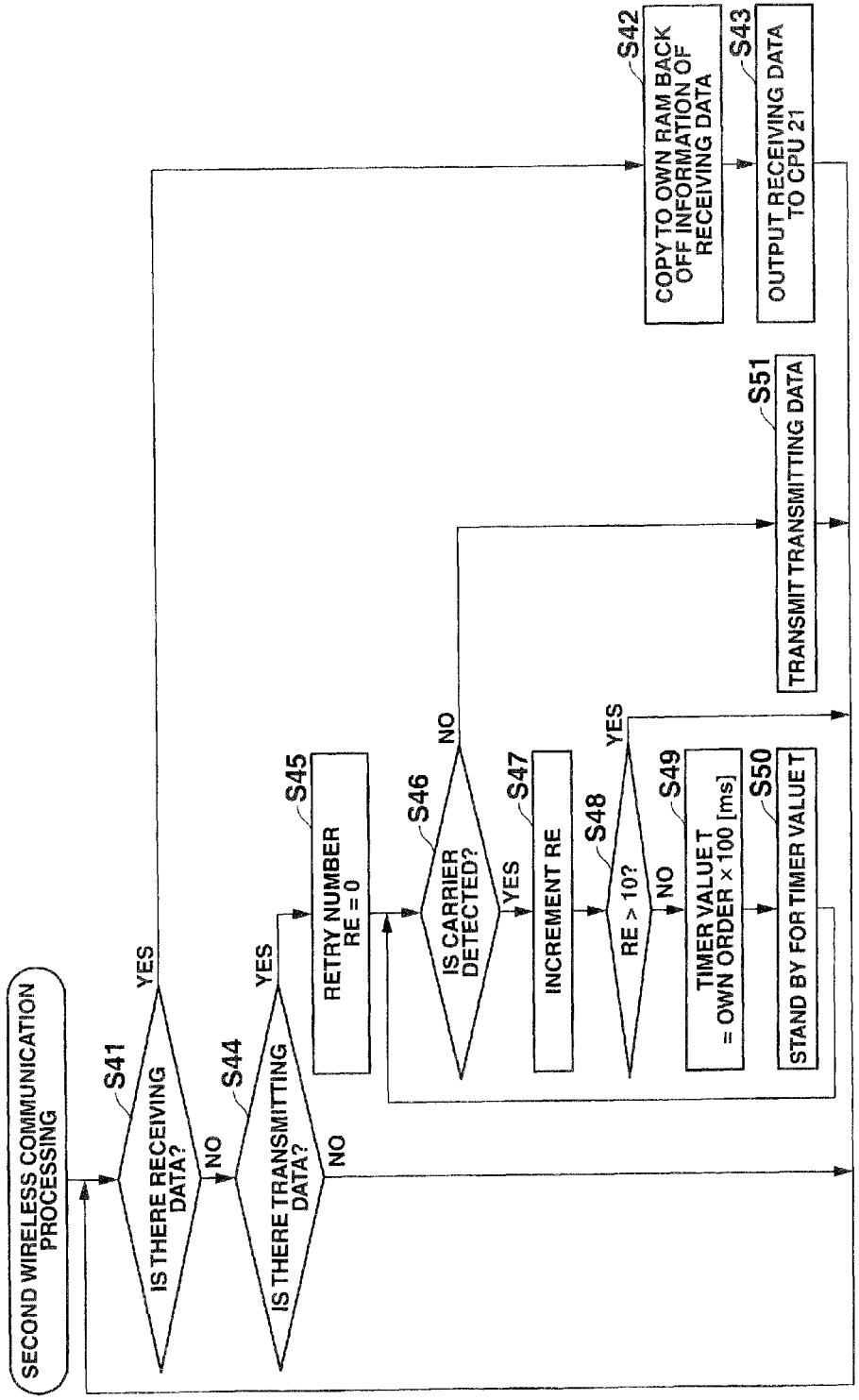
FIG. 11 is a flowchart showing second wireless communication processing performed by the handy terminal.

FIG. 11 is a flowchart showing a second wireless communication processing performed by the handy terminal 20A.

The communication management processing performed in the controller 10 is described with reference to FIG. 6 and FIG. 7. The communication management processing is processing to manage packet number as communication number of handy terminals 20A to 20J during wireless communication between the controller 10 and the handy terminals 20A to 20J in later described first wireless communication processing and second wireless communication processing.

In the controller 10, triggered by the start of later described communication management processing in the first wireless communication processing, the CPU 1651 performs the communication management processing in coordination with the communication management program 1654 read out from the ROM 1653 and suitably expanded to the RAM 1652.

First, the CPU 1651 obtains the present time information from the clocking section 1656 (step S11). Then, the CPU 1651 judges whether or not the last digit of the minute part of the time information obtained in step S11 is 0 (step S12). For example, it is judged whether or not it is 10 minutes, 20 minutes, etc.

When the last digit of the minute part of the time information is 0 (step S12; YES), the CPU 1651 sets to 0 the data of the column of the minute part packet number 82 corresponding to the minute part of the present time information of the communication management table 80 stored in the RAM 1652 (step S13). When there is no communication management table 80 in the RAM 1652, a new communication management table 80 is made and stored in the RAM 1652. In the example in FIG. 4, when the time information is "13:20", the data of the column of the minute part packet number 82 corresponding to this "20" is set to 0.

Then, the CPU 1651 updates the active state terminal number and the total packet number of the minute part packet number 82 stored in the RAM 1652 based on the updated communication management table 80 (step S14). When there is no active state terminal number in the RAM 13, a new active state terminal number is made and stored in the RAM 1652. When the last digit of the minute part of the time information is not 0 (step S12; NO), the processing advances to step S14.

Then, the CPU 1651 performs the back off information fixed interval update processing (step S15). Then, the CPU 1651 stands by for one minute according to the present time information obtained from the clocking section 1656 (step S16) and the processing advances to step S11.

The first back off information fixed interval update processing as the back off information fixed interval update processing in step S15 is described with reference to FIG. 7. First, the CPU 1651 refers to the communication management table 80 and deletes the handy terminal in which the total packet number of the minute part packet number 82 is newly set to 0 from the back off information 92 of the back off information table 90 stored in the RAM 1652 (step S21). Then, the CPU 1651 adds the handy terminal in which the total packet number of the minute part packet number 82 is not newly set to 0 to the end of the back off information 92 (lowest priority of communication) (step S22), and ends the first back off information fixing interval update processing.

In step S22, for example, as shown in the back off information table 90a shown in FIG. 8, the handy terminal 20E in which the total of the minute part packet number 82 is not newly 0 from the back off information table 90 of FIG. 5 is added to the end of the back off information 92.

Next, the first wireless communication processing shown in FIG. 9 is described. The first wireless communication processing performed by the controller 10 is processing of performing wireless communication with the handy terminals 20A to 20J.

During open hours in the establishment 2 provided with the order entry system 1, the ten serving staff each hold handy terminals 20A to 20J and are distributed in the floor. For example, when there is an order from the establishment customer, the serving staff holding the handy terminal 20A inputs the order information in the handy terminal 20A and the order information is transmitted by wireless transmission from the handy terminal 20A to the controller 10. The information transmitted from the handy terminal 20A to the controller 10 is not limited to order information and can be other information. Information is suitably transmitted from the controller 10 to the handy terminal 20A. The same can be said for the wireless communication between the controller 10 and the handy terminals 20B to 20J.

In the controller 10, for example, triggered by the input of the power source, the CPU 1651 performs the first wireless communication processing in coordination with the first wireless communication program 1655 read out from the ROM 1653 and suitably expanded to the RAM 1652.

First, the CPU 1651 starts the communication management processing shown in FIG. 6 (step S31). Then, the CPU 1651 judges whether or not there is receiving data received by the receiving section 164 from the handy terminals 20A to 20J (step S32). When there is no receiving data (step S32; NO), the CPU 1651 judges whether or not there is transmitting data transmitted through the transmitting section 162 to the handy terminals 20A to 20J (step S33).

When there is no transmitting data (step S33; NO), the processing advances to step S32. When there is transmitting data (step S33; YES), the CPU 1651 refers to the present time information from the clocking section 1656, refers to the communication management table 80 stored in the RAM 1652 and adds the transmitting packet number of the transmitting data to the minute part packet number 82 corresponding to the present time information and the handy terminal of the transmitting destination (step S34).

Then, the CPU 1651 makes the transmitting data actually transmitted by adding the back off information of the back off information table 90 stored in the RAM 1652 to the original transmitting data (step S35).

Here, for example, a case of the original transmitting data 110 shown in FIG. 10A is considered. The transmitting data 110 includes transmitting destination 111, transmitting source 112, ACK 113, packet type 114, data length 115 and data 116. The transmitting destination 111 is identification information of the handy terminal of the transmitting destination of the transmitting data. The transmitting source 112 is identification information of the transmitting source (here, the controller 10) of the transmitting data. The ACK 113 is information of ACK. The packet type 114 is information of content type of packet of transmitting data. The data length 115 is information of length of data 116. The data 116 is actual data of the content of the transmitting data.

In step S35, the transmitting data 110a shown in FIG. 10B is made by adding back off information length 117 and back off information 118 to the original transmitting data 110. The back off information length 117 is information of the length of the back off information 118. The back off information 118 is back off information combining the terminal number 91 and the back off information 92 of the back off information table 90 read out from the RAM 1652. The back off information 118 shown in FIG. 10A is based on data of the back off information table 90a shown in FIG. 8.

Then, the CPU 1651 updates the order of the handy terminal of the back off information 92 of the back off information table 90 stored in the RAM 1652 (step S36). Specifically, the handy terminal of the transmitting destination of the transmitting data of step S37 is aligned again to the end of the back off information 92 (lowest priority of communication). Then, the CPU 1651 transmits by wireless transmission the transmitting data added with the back off information made in step S35 through the transmitting section 162 to the handy terminal of the transmitting destination (step S37) and the processing advances to step S32.

When there is receiving data (step S32; YES), the CPU 1651 outputs the receiving data received in step S32 to the CPU 11 (step S38) and the processing advances to step S32.

Next, the second wireless communication processing is described with reference to FIG. 11. The second wireless communication processing performed by the handy terminal is processing of wireless communication with the controller 10. Here, an example where the handy terminal 20A performs the second wireless communication processing is described. However, the same can be said for the handy terminals 20B to 20J.

In the handy terminal 20A, for example, triggered by the input of the power source, the CPU 2651 performs the second wireless communication processing in coordination with the second wireless communication program 2654 read out from the ROM 2653 and suitably expanded to the RAM 2652.

First, the CPU 2651 judges whether or not there is receiving data received by the receiving section 264 from the controller 10 (step S41). When there is receiving data (step S41; YES), the CPU 2651 copies the back off information of the receiving data to the RAM 2652 (step S42).

For example, when the receiving data of the handy terminal 20A from the controller 10 (transmitting data from the controller 10) is transmitting data 110a of FIG. 10B, the terminal number and the back off information of the back off information 118 is stored in the RAM 2652.

Then, the CPU 2651 outputs the receiving data to the CPU 21 (step S43) and the processing advances to step S41.

When there is no receiving data (step S41; NO), the CPU 2651 judges whether or not there is transmitting data transmitted to the controller 10 through the transmitting section 262 (step S44).

When there is no transmitting data (step S44; NO), the processing advances to step S41. When there is transmitting data (step S44; YES), the CPU 2651 sets variable RE of the retry number to 0 (step S45). Then, the CPU 2651 judges whether or not the carrier of the channel to be used in communication is detected according to the carrier detection information from the carrier detecting section 263 (step S46). When the carrier is detected (step S46; YES), another handy terminal is using the channel for communication, and the CPU 2651 increments 1 to the retry number RE (step S47).

Then, the CPU 2651 judges whether or not the retry number RE is larger than 10 (step S48). When the retry number RE is 10 or less (step S48; NO), the CPU 2651 refers to the back off information stored in the RAM 2652 and calculates timer value T=(own order of back off information)×100 [ms] (step S49). The own order of back off information is order of priority of the handy terminal.

The own order of the back off terminal is, for example, in a handy terminal 20A, when the back off information "BACE" is stored in the RAM 2652 corresponding to the transmitting data 110a of FIG. 10B, the own order of the back off information is 2. Here, the timer value T=200 [ms].

Then, according to the present time information from the clocking section 2655, the CPU 2651 stands by for the timer value T (back off time) calculated in step S49 (step S50) and the processing advances to step S46. When the carrier is not detected (step S46; NO), the CPU 2651 transmits the transmitting data through the transmitting section 262 to the controller 10 of the transmitting destination (step S51) and the processing advances to step S41.

According to the above embodiment, the controller 10 calculates the total packet number of each of the handy terminals 20A to 20J, stores the number in the communication management table 80 of the RAM 1652, sets the back off information indicating the priority of communication of the handy terminals 20A to 20J according to the total packet number stored in the communication management table 80 and transmits the back off information to the handy terminals 20A to 20J. Based on the back off information received from the controller 10, the handy terminals 20A to 20J set a shorter back off time as the priority is set higher in the communication with the controller 10. Therefore, the congestion of wireless communication of each handy terminal decreases and the communication efficiency is enhanced.

The controller 10 sets the back off information so that a low priority is set for the communication of the handy terminal in which new communication is generated and a low priority is set for the communication of the handy terminal in which communication ends according to the total packet number stored in the communication management table 80. Therefore, a high priority can be set for communication of the handy terminal in which communication is already generated, a high priority can be set for communication of the handy terminal already on stand by, and a high priority can be set for the handy terminal in which communication is not finished. Therefore, the communication efficiency of the wireless communication of the handy terminals can be enhanced.

The controller 10 adds the set back off information to the transmitting data and transmits the data to the handy terminals 20A to 20J. Therefore, the communication efficiency of the wireless communication of the handy terminals can be further enhanced.

(Second Embodiment)

The second embodiment of the present invention is described with reference to FIG. 12 and FIG. 13.

Figure 12:
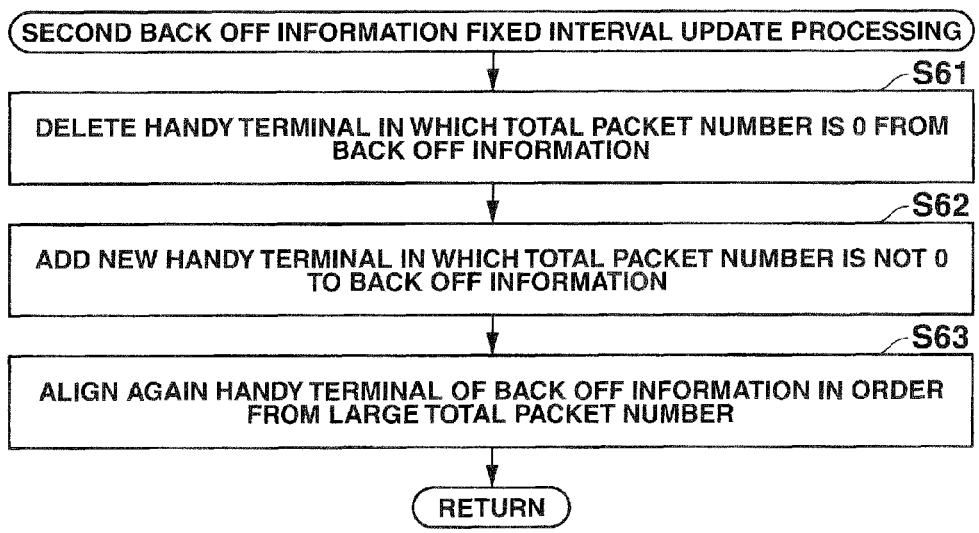
FIG. 12 is a flowchart showing second back off information fixed interval update processing of communication management processing.

FIG. 12 is a flowchart showing a second back off information fixed interval update processing of the communication management processing.

Figure 13A:
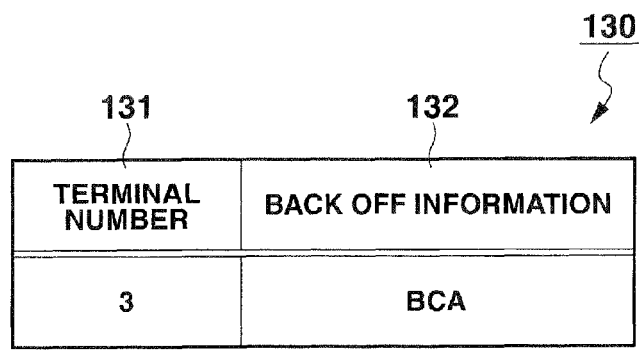
FIG. 13A is a diagram showing a configuration of a back off information table before update.

FIG. 13A is a diagram showing a configuration of a back off information table 130 before update.

Figure 13B:
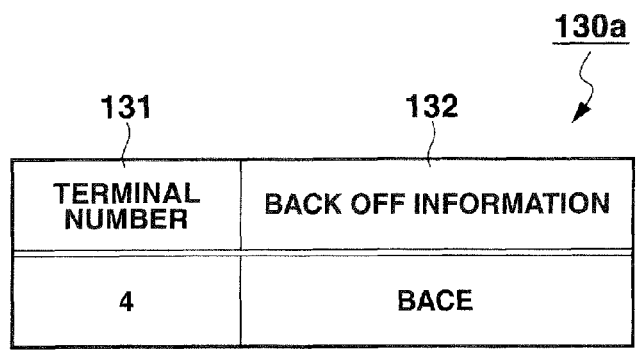
FIG. 13B is a diagram showing a configuration of a back off information table after update.

FIG. 13B is a diagram showing a configuration of a back off information table 130a after update.

In the present embodiment, the order entry system 1 of the first embodiment is used as the apparatus configuration. Therefore, the description of the apparatus configuration of the present embodiment is omitted.

The back off information table 130 shown in FIG. 13A is stored in the RAM 1652 instead of the back off information table 90 shown in FIG. 5. The back off information table 130 includes terminal number 131 and back off information 132. The terminal number 131 and the back off information 132 are similar to the terminal number 91 and the back off information 92 of the back off information table 90.

The operation of the order entry system 1 of the present embodiment is similar to the first embodiment, but the second back off information fixed interval update processing shown in FIG. 12 is performed in step S15 of the communication management processing shown in FIG. 6. Therefore, only the second back off information fixed interval update processing is described.

As shown in FIG. 12, first the CPU 1651 refers to the communication management table 80 and deletes the handy terminal in which the total of the minute part packet number 82 is 0 from the back off information 132 of the back off information table 130 stored in the RAM 1652 (step S61). Then, the CPU 1651 refers to the communication management table 80 and adds the handy terminal in which the total of the minute part packet number 82 is not newly 0 to the back off information 132 of the back off information table 130 (step S62).

Then, the CPU 1651 refers to the communication management table 80, aligns the handy terminal of the back off information 132 of the back off information table 130 in an order from the large total packet number of the minute part packet number 82 (step S63), and ends the second back off information fixed interval update processing.

For example, the "BCA" of the back off information 132 of the back off information table 130 shown in FIG. 13A is to be "BACE" of the back off information 132 in the total packet number order added with the handy terminal 20E of the back off information table 130a shown in FIG. 13B by performing the second back off information fixed interval update processing.

According to the above embodiment, the controller 10 sets the back off information so that the priority of communication of the handy terminal is high in the order that the total packet number stored in the communication management table 80 of the RAM 1652 is large. Therefore, congestion of wireless communication of each handy terminal can be reduced and the communication efficiency can be enhanced.

The description of the above embodiment is one example of the wireless communication system of the present invention and is not limited to the above.

In the above described embodiment, the total packet number of each handy terminal is calculated as the communication number, however the configuration is not limited to the above. For example, other configurations of counting the communication number can be employed such as the order number, etc. communicated by each handy terminal considered as the communication number.

The detailed configuration and the detailed operation of the order entry system of the above embodiment can be suitably changed without leaving the scope of the present invention.

The embodiment of the present invention is described above, however, the scope of the present invention is not limited to the above embodiment and includes the scope of invention described in the claims and its equivalents.

The entire disclosure of Japanese Patent Application No. 2011-069437 filed on Mar. 28, 2011 including specification, claims, drawings and abstract are incorporated herein by reference in its entirety.

What is claimed is:

1. A wireless communication system comprising:
a controller; and
a plurality of communication terminals;
wherein the controller and the plurality of communication terminals are connected to each other for communication,
wherein the controller includes:
a first wireless communication section which communicates by wireless communication with the communication terminals;
a communication number control section which counts a communication number of each of the communication terminals communicated through the first wireless communication section and stores the numbers in a storage section; and
a first communication control section which sets back off information indicating a priority of communication of the communication terminals according to the communication numbers stored in the storage section and transmits the back off information through the first wireless communication section to the communication terminals,
wherein each of the communication terminals includes:
a second wireless communication section which communicates by wireless communication with the controller; and
a second communication control section which sets a back off time of communication with the controller to be shorter as the priority of communication becomes higher based on the back off information received from the controller through the second wireless communication section, and
wherein the first communication control section sets the back off information so that a low priority is set for communication of (i) a communication terminal in which new communication is generated and (ii) a communication terminal in which communication ends, according to the communication numbers stored in the storage section.

2. The wireless communication system according to claim 1, wherein the first communication control section sets the back off information so that a high priority is set for communication of a communication terminal in order from a large communication number stored in the storage section.

3. The wireless communication system according to claim 1, wherein the first communication control section transmits to the communication terminals the set back off information with transmitting data added therein.

* * * * *